Sept. 22, 1964   D. H. MELBYE   3,149,876
TRAILERS
Filed May 26, 1961   4 Sheets-Sheet 1
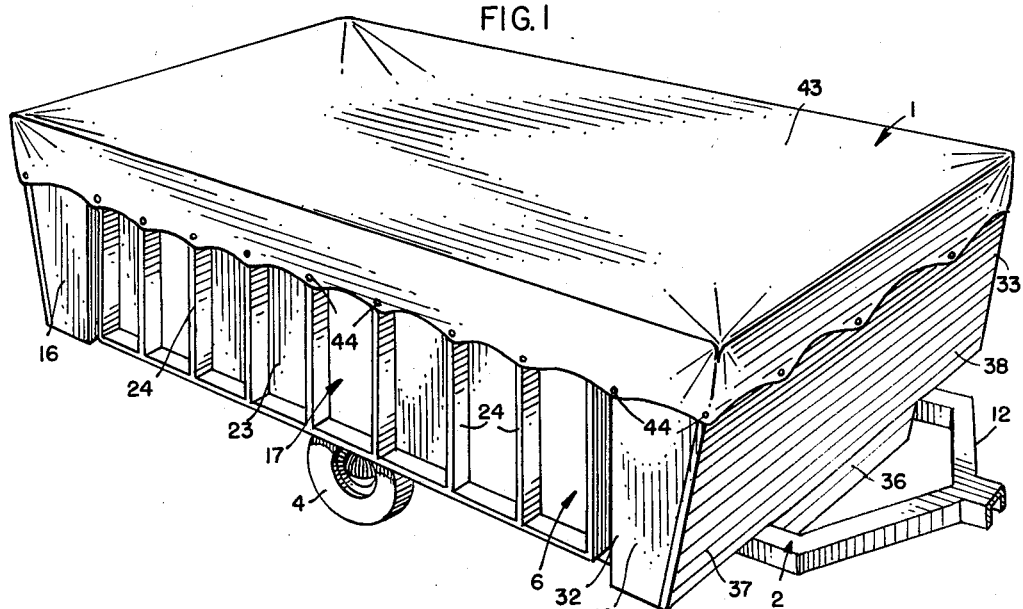
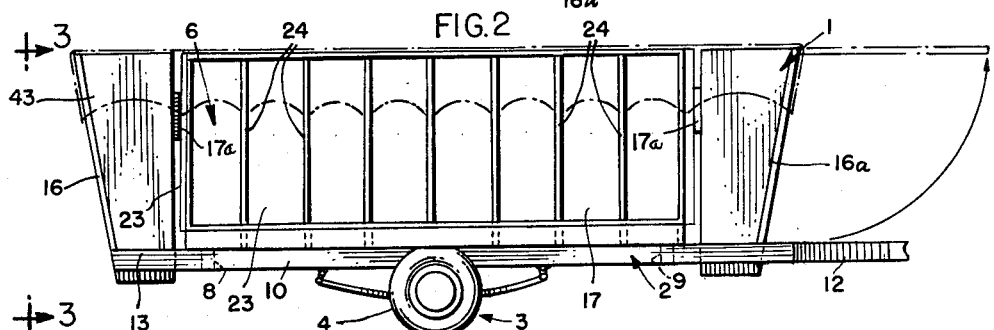
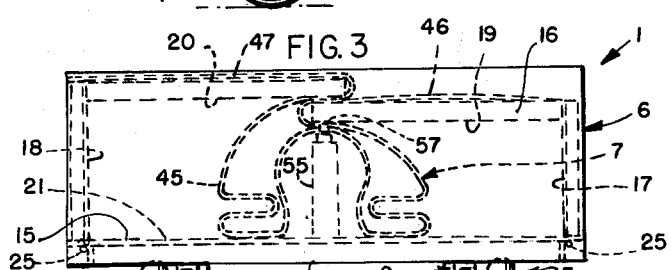
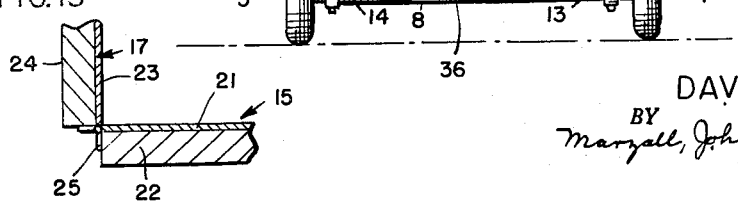
INVENTOR:
DAVID H. MELBYE
BY Marshall, Johnston, Cook + Root
ATT'YS Sept. 22, 1964     D. H. MELBYE     3,149,876

TRAILERS

Filed May 26, 1961     4 Sheets-Sheet 2

INVENTOR:
DAVID H. MELBYE
BY
ATT'YS

Sept. 22, 1964   D. H. MELBYE   3,149,876
TRAILERS
Filed May 26, 1961   4 Sheets-Sheet 3
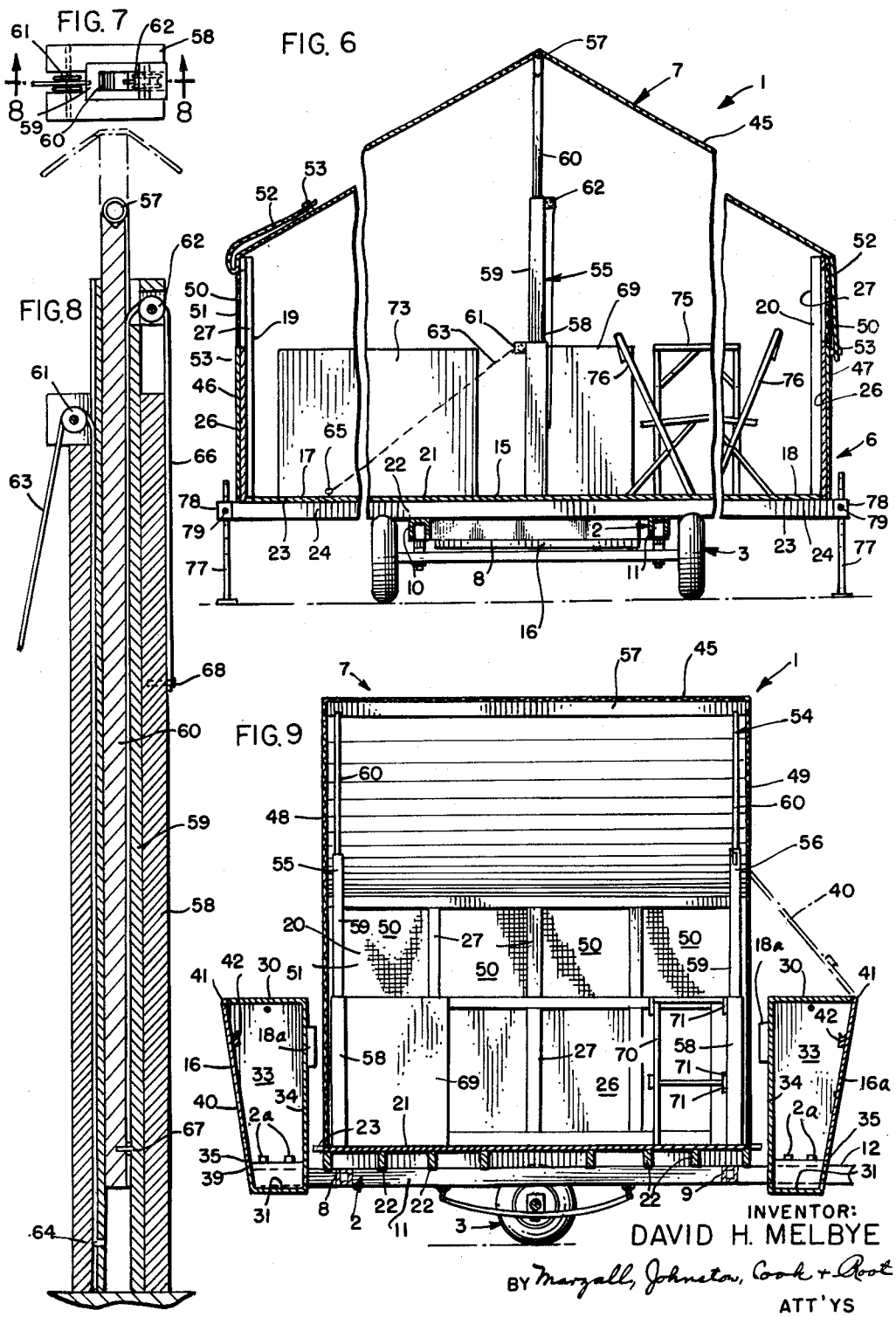
INVENTOR:
DAVID H. MELBYE
BY Marzall, Johnston, Cook + Root
ATT'YS

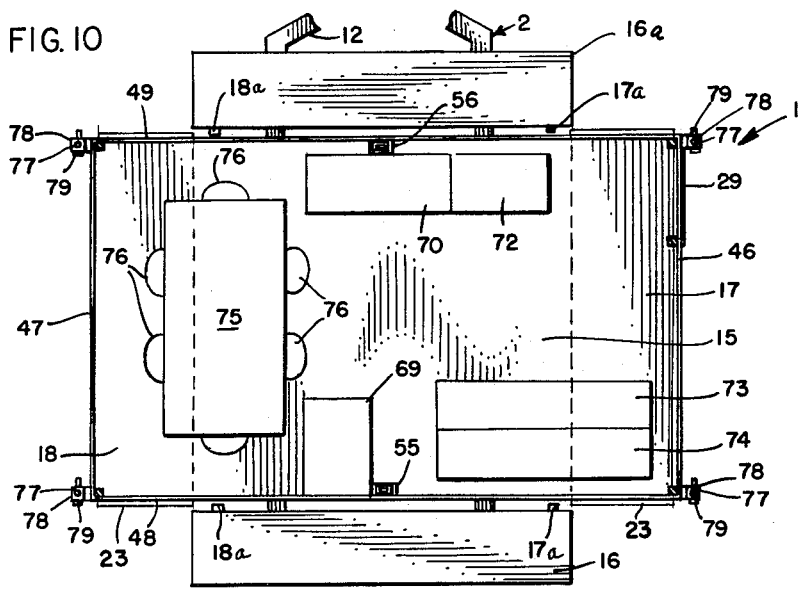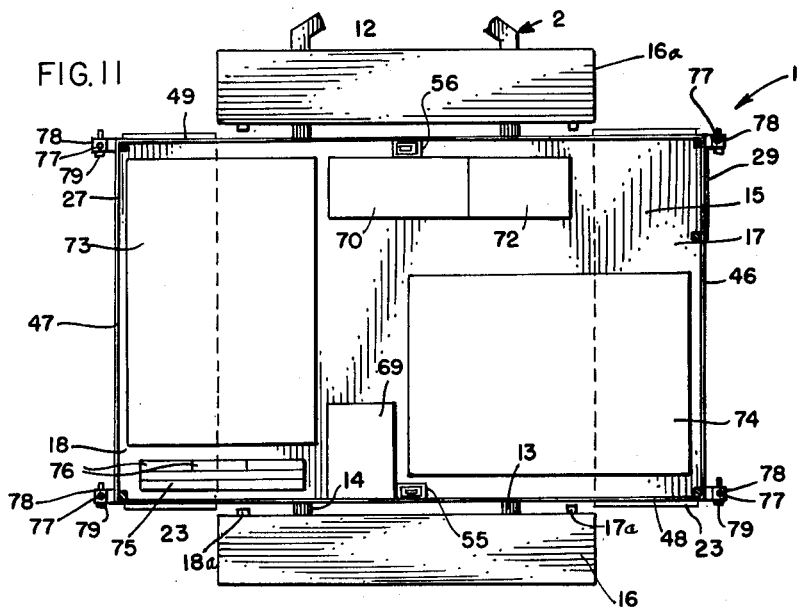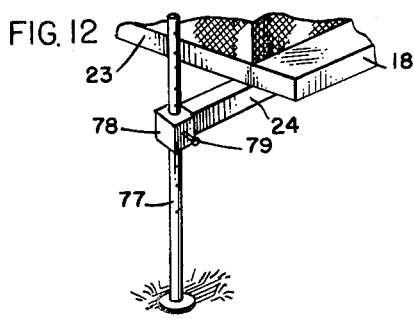

United States Patent Office 3,149,876
Patented Sept. 22, 1964

3,149,876
TRAILERS
David H. Melbye, 4513 W. 101st St., Oak Lawn, Ill.
Filed May 26, 1961, Ser. No. 112,807
6 Claims. (Cl. 296—23)

This invention relates to trailers and more particularly to trailers which are particularly well adapted for camping in.

It is a primary object of the present invention to afford a novel trailer.

As is known to those skilled in the art, trailers, which are commonly known as "camping trailers," are a type of trailer which is adapted to be pulled behind vehicles, or the like, from one camp site or location to another, and are particularly adapted for living in, or sleeping in when disposed in such a camp site, or the like.

Camping trailers of the general type to which the present invention pertains have been heretofore known in the art. However, such camping trailers as have been heretofore known in the art have had several inherent disadvantages such as, for example, being excessively heavy; being excessively large and cumbersome in size when in condition for movement from one camp site or location to another; affording inadequate, and even small, cramped space for sleeping and living quarters when located at a camp site, or the like; affording uncomfortable living and sleeping quarters; affording little or no cupboard space, closet space, or other storage space; being difficult and slow to change from a collapsed or closed condition in which they are adapted to be transported from one camp site to another, and an open or erected condition in which they are adapted to be lived or slept in, and vice versa; being complicated in construction and operation; affording poor trailing characteristics when being pulled behind a vehicle in said closed or collapsed condition; or being difficult and expensive to produce commercially, or the like. It is an important object of the present invention to overcome such disadvantages.

Another object of the present invention is to provide a novel camping trailer which is small and compact in size when in collapsed or closed condition for transporting from one location or camp site to another, and which is relatively large and spacious in size when in open or erected condition for sleeping in or living in.

Another object is to afford a novel camping trailer of the aforementioned type which may be quickly and easily erected from transporting condition to living and sleeping condition, and may also be quickly and easily collapsed from living and sleeping condition into transporting condition.

An object ancillary to the foregoing is to afford a novel camping trailer of the aforementioned type wherein the change from transporting to living condition, and vice versa, may be made by relatively unskilled persons in a matter of very few minutes, such as, for example, a matter of five or ten minutes.

Another object of the present invention is to afford a camping trailer of the aforementioned type which embodies a trailer body portion and a tent portion constituted and arranged in a novel and expeditious manner.

A further object is to afford a novel camping trailer of the aforementioned type wherein the tent portion is constituted and arranged within the trailer body in a novel and expeditious manner when the trailer is disposed in transporting condition.

Yet another object is to afford a camping trailer wherein the parts of the trailer are so constituted and arranged relative to each other as to afford a novel, relatively closed trailer body when the trailer is in transporting condition.

Another object of the present invention is to afford a novel camping trailer of the aforementioned type wherein the tent portion projects above the trailer body, and is constituted and arranged relative thereto in a novel and expeditious manner, when the trailer is in condition for living in and sleeping in.

A further object is to afford a novel camping trailer of the aforementioned type wherein the trailer body embodies a floor portion, side wall portions, and top wall portions constituted and arranged in a novel and expeditious manner relative to each other when the trailer is in collapsed or closed condition for transporting, and when the trailer is in open or erected condition for living in or sleeping in.

Another object of the present invention is to afford a novel camping trailer of the aforementioned type wherein the floor portion is disposed in substantially horizontally extending position and the side walls are disposed in substantially upright position when the trailer is in condition for transporting, and wherein the floor portion and side wall portions are disposed in substantially horizontally extending uniplanar relation to each other when the trailer is disposed in condition for living in or sleeping in.

A further object is to provide a novel camping trailer of the aforementioned type wherein the side wall portions may be quickly and easily moved from said upright position to said horizontally extending position and vice versa.

Another object is to provide a novel camping trailer of the aforementioned type wherein such movement of the side wall portions between the aforementioned upright position and the aforementioned horizontally extending position is effective to cause the tent portion to move between the aforementioned erected and collapsed positions in a novel and expeditious manner.

An object ancillary to the foregoing is to afford a novel trailer wherein the aforementioned movement of the tent portion thereof is effected automatically in a novel and expeditious manner during said movement of said side walls thereof.

Yet another object of the present invention is to afford a novel camping trailer of the aforementioned type wherein the side wall portions of the trailer body are effectively and efficiently supported when disposed in the aforementioned horizontally extending position.

Another object is to provide a camping trailer of the aforementioned type wherein the parts thereof are so constituted and arranged as to afford relatively spacious, practical storage space when the trailer is in condition either for transporting, or for living in and sleeping in.

An object ancillary to the foregoing is to afford a novel camping trailer of the aforementioned type wherein readily accessible storage space, which is well protected from the elements, is afforded at each end of the trailer body.

A further object is to provide a novel trailer of the aforementioned type which embodies novel mechanism for supporting the tent portion in erected position, and for raising and lowering the same.

Another object of the present invention is to provide a novel camping trailer of the aforementioned type wherein cabinets, stoves, beds, dining tables, chairs, and the like, may be constituted and arranged therein in a practical, novel and expeditious manner when the trailer is in condition for transporting, and when it is in condition for living in or sleeping in.

Another object of the present invention is to afford a novel trailer of the aforementioned type which is practical and efficient in construction and operation, and which may be readily and economically produced.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a front perspective view of a camping trailer embodying the principles of the present invention, with the trailer shown in collapsed or closed condition for transporting, and the like;

FIG. 2 is a side elevational view of the trailer shown in FIG. 1;

FIG. 3 is a rear end elevational view of the trailer shown in FIG. 1, looking in the direction of the arrows 3—3 in FIG. 2;

FIG. 4 is a side elevational view of the trailer shown in FIG. 1, but showing the trailer disposed in open or erected condition for living in and sleeping in;

FIG. 6 is a fragmentary transverse view taken substantially along the lines 6—6 in FIG. 4;

FIG. 7 is a detail top plan view of a portion of the trailer shown in FIG. 6;

FIG. 8 is a longitudinal sectional view taken substantially along the line 8—8 in FIG. 7;

FIG. 9 is a longitudinal sectional view through the erected trailer, taken substantially along the line 9—9 in FIG. 5;

FIG. 10 is a somewhat diagrammatic top plan view of the erected trailer, showing furniture therein as it may be arranged for use during meal times, and the like;

FIG. 11 is a view similar to FIG. 10 showing furniture therein as it may be arranged to afford sleeping quarters;

FIG. 12 is an enlarged detail perspective view of a portion of the trailer shown in FIG. 4; and FIG. 13 is an enlarged detail sectional view of a portion of the trailer shown in FIG. 3.

Figure 4:
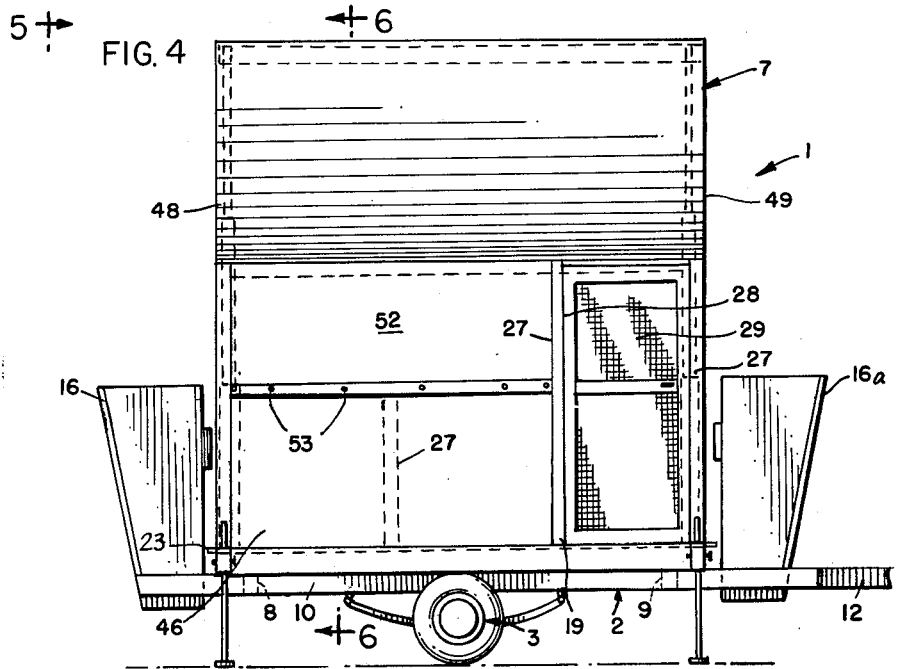

A camping trailer 1, embodying the principles of the present invention, is shown in the drawings to illustrate the preferred embodiment of the present invention.

The trailer 1 includes, in general, a supporting frame 2 mounted on a suitable running gear 3, including a pair of wheels 4 and 5, a body portion 6 mounted on and supported by the frame 2, and a tent portion 7 mounted on and supported by the body portion 6, FIGS. 1–6.

The frame 2 is substantially rectangular in shape and includes a rear end member 8 and a front end member 9 disposed in substantially parallel relation to each other, the end members 8 and 9 being attached to respective ends of two substantially parallel side members 10 and 11 by suitable means such as welding. A tongue 12 is secured to and projects forwardly from the longitudinal central portion of the front end member 9, and may have any suitable type of a trailer hitch, or the like, not shown, on the front end thereof for attaching the trailer 1 to an automobile, or the like. Two elongated supporting members 13 and 14 project rearwardly from the rear member 8 of the frame 2 in parallel spaced relation to each other, FIGS. 2, 3, and 5, for a purpose which will be discussed in greater detail presently. The members 8–14 of the frame 2 may be made of any suitable material such as, for example, steel channel-shaped members, and may be secured together by any suitable means such as, for example, welding.

The body portion 6 of the trailer 1 includes a floor 15, two substantially upright hollow end walls 16 and 16a, two side walls 17 and 18, and two top panels 19 and 20, FIGS. 1, 2, and 3. The floor 15 includes flooring 21 mounted on and secured to reinforcing members or beams 22, which are disposed in substantially perpendicular relation to the length of the side members 10 and 11 of the frame 2, the beams 22 being mounted on top of, and secured to the side members 10 and 11 by suitable means such as brackets, not shown. The beams 22 may be made of any suitable material such as, for example, plywood sheeting.

The side walls 17 and 18 of the body portion 6 each include panel members 23, which are disposed in substantially perpendicular relation to the floor 15 when the trailer body 6 is in transporting condition, each of the panel members 23 having reinforcing ribs 24 secured to the outer face thereof in parallel spaced relation to each other, FIGS. 1, 2 and 6. The panel members 23 may be made of any suitable material, but I prefer to construct the panels 23 from unitary sheets of plywood. The reinforcing ribs 24 may, likewise, be made of any suitable material, but I prefer to construct these members of wood such as, for example, wooden members having a width of three inches and a thickness of one inch. The reinforcing ribs 24 of each of the side walls 17 and 18 are each preferably disposed in the same plane as a respective one of the ribs 24 on the other of the side walls 17 and 18, and in the same plane as a respective one of the beams 22 of the floor 15.

Figure 5:
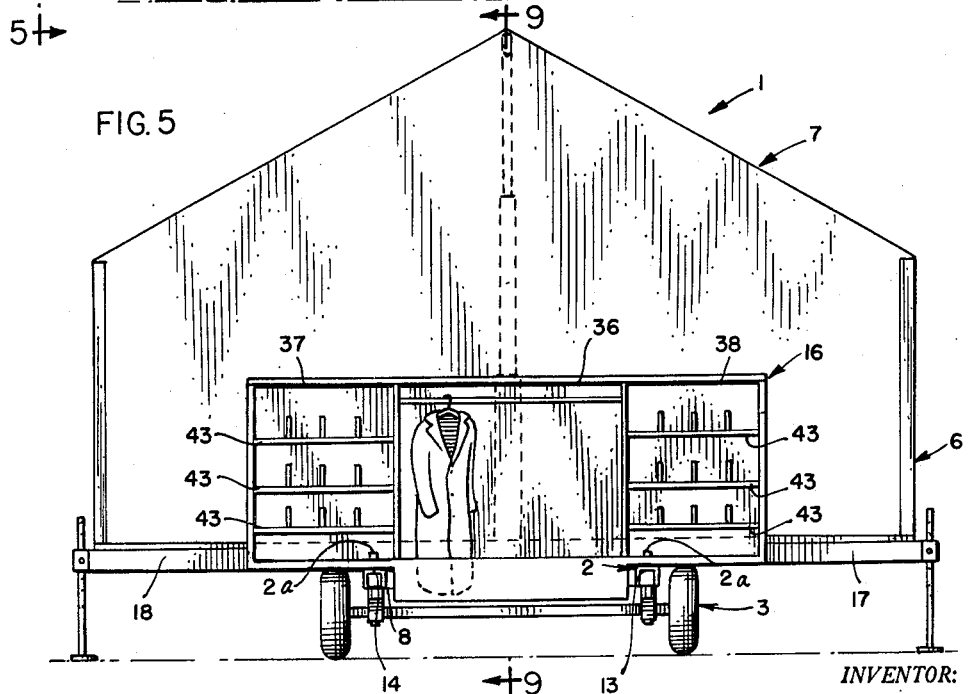
FIG. 5 is a rear end elevational view of the erected trailer shown in FIG. 4, with the door to the rear cupboard or closet removed to show the interior thereof.

The side walls 17 and 18 are hingedly connected to respective sides of the floor 15 by suitable hinges 25, FIGS. 3 and 13. The walls 17 and 18 terminate at their lower ends in the plane of the upper face of the floor 15, when the walls 17 and 18 are disposed in upright position as shown in FIGS. 3 and 13. The hinges 25 are disposed between the lower ends of the walls 17 and 18 and the adjacent side edges of the floor 15, as shown in FIG. 13, and the side walls 17 and 18 are pivotable on the hinges 25 from the upright position shown in FIGS. 3 and 13 to substantially horizontally extending position, as shown in FIGS. 5 and 6, wherein the panels 21 of the side walls 17 and 18 are disposed in uniplanar relation to each other and to the flooring 21 of the floor 15, and the reinforcing ribs 24 of the side walls 17 and 18 are disposed in longitudinal alignment with respective ribs 24 of the other of the side walls 17 and 18 and with respective ones of the beams 22 of the floor 15.

The top walls 19 and 20 are rigidly secured to the side edge portions of the side walls 17 and 18, respectively, which constitute the upper edge portions of the side walls 17 and 18 when the latter are disposed in upright position as shown in FIG. 3, and are somewhat shorter in length than the side walls 17 and 18. The top wall panels 19 and 20 project inwardly from the side walls 17 and 18 in substantially perpendicular relation thereto, and are movable with the side walls 17 and 18. Each of the top wall panels 19 and 20 includes a panel member 26, which is substantially rectangular in shape, and a plurality of substantially parallel, spaced reinforcing ribs 27 secured to and extending transversely across the inner face of the panel member 26 perpendicular to the length of the panel member 26, FIGS. 4, 6 and 9. The panel members 26 may be made of any suitable material, but I prefer to make them of unitary sheets of plywood. Similarly, the reinforcing members 27 may be made of any suitable material, but I prefer to make them of wooden boards having a thickness of approximately one inch and a width of approximately three inches.

When the trailer 1 is in transporting condition, as shown in FIGS. 1–3, the top panel members 19 and 20 project substantially horizontally inwardly from the side walls 17 and 18, respectively, and terminate at their inner ends in overlapped relation to each other, with the top panel 20 disposed above the top panel 19, FIG. 3. To enable this to be accomplished, the side wall 17 is somewhat shorter than the side wall 18.

The top panels 19 and 20 of the trailer body 6 are movable with the side walls 17 and 18, respectively, between the horizontally extending position shown in FIG. 3 to the upright position shown in FIG. 6, which latter position they project substantially vertically upwardly from the outer longitudinal edge portions of the then horizontally disposed side walls 17 and 18 respectively.

The top wall panel 19 has a doorway 28 formed in the front end portion, or right end portion thereof, as viewed in FIG. 4. The doorway 28 extends across substantially the full width of the top wall panel 19, and a door 29 is mounted in the doorway 28 and is hingedly secured to the top wall panel 19.

The hollow end walls 16 and 16a of the trailer body 6 are identical to each other in construction, each including a top wall 30 and a bottom wall 31 disposed in parallel relation to each other, two parallel end walls 32 and 33 disposed perpendicularly to the walls 30 and 31, an inner side wall 34 disposed perpendicular to the walls 30–33, and an outer side wall 35 extending downwardly and inwardly from the top wall 30 to the bottom wall 31, the top wall 30 being greater in width than the bottom wall 31 so that the end walls 16 and 16a are trapezoidal in transverse cross section, FIGS. 1 and 9. The end walls 16 and 16a extend longitudinally across the full width of the rear and front end portions, respectively, of the trailer 1 when the trailer 1 is in closed or transporting condition, as shown in FIGS. 1, 2 and 3. The longitudinal center portion 36 of each of the end walls 16 and 16a projects downwardly below the end portions 37 and 38 thereof, and the outer side wall 35 of each of the end walls 16 and 17 is of two-piece construction, the one piece thereof constituting a panel 39 stationarily secured to the bottom wall 31 and the end walls 32 and 33, and extending across, and closing the outer side of the aforementioned downwardly projecting central portion 36. The other portion of the outer side wall 35 of each of the end walls 16 and 17 constitutes a door 40 hingedly connected by suitable hinges 41 to the respective top wall 30 for pivotal movement between the normally closed position shown in solid lines in FIG. 9 and the normally open position shown in broken lines in FIG. 9 on the end wall 16a. The doors 40 extend across the entire length of the end walls 16 and 16a, and close the latter above the bottom portions 36 thereof when the doors 40 are disposed in closed position. In closed position, the doors 40 rest against the adjacent edges of the adjacent end walls 32 and 33 and terminate at their outer ends in uniplanar relation to the outer faces of the latter.

Two elongated gutters 42 are secured to the inner faces of the doors 40 and extend longitudinally thereacross and terminate at their outer ends in closely adjacent relation to the end walls 32 and 33. The gutters 42 are concave upwardly in transverse cross section when the doors 40 are disposed in closed position as shown in solid lines in FIG. 9, and afford conduits for feeding any liquid such as, for example, rain water, or the like, which may pass downwardly between the upper edges of the doors 40 and the top walls 30 of the end walls 16 and 16a, longitudinally across the doors 40 to the junctions between the doors 40 and the outer longitudinal edges of the end walls 32 and 33. With the end walls 16 and 16a being of the aforementioned trapezoidal shape, and with the gutters 42 disposed on the doors 40 in the aforementioned manner, it has been found that any liquid which may pass downwardly between the doors 40 and the top walls 30, when the doors 40 are disposed in closed position, passes along the gutters 42 to the junctions between the doors 40 and the end walls 32 and 33 and then passes downwardly along the junction between the doors 40 and the end walls 32 and 33 and out from the end walls 16 and 16a at the bottom of the doors 40. With this construction, the end walls 16 and 16a afford structures having a substantially weather-tight interior and afford dry, practical, and efficient storage space.

As shown in FIG. 5, wherein the end wall 16 is shown with the door 40 removed, the end walls 16 and 16a may be readily arranged to afford effective cupboard and closet storage space, the end portions 37 and 38 thereof being readily adapted for having shelves 43 mounted therein, and the central portion 36, which it will be remembered is somewhat deeper than the end portions 37 and 38, affording relatively spacious closet space.

The end wall 16 rests on the supporting members 13 and 14, which project rearwardly from the rear end member 8 of the trailer frame 2, with the lower central portion 36 of the end wall 16 disposed between the members 13 and 14 and the end portions 37 and 38 resting on the members 14 and 13, respectively. Similarly, the end wall 16a rests on the tongue 12, with the lower central portion 36 of the end wall 16a projecting downwardly through the tongue 12, and with end portions 37 and 38 of the end wall 16a resting on the tongue 12. The end walls 16 and 16a may be secured to the supporting members 13 and 14 and the tongue 12, respectively, by any suitable means such as bolts 2a, FIGS. 5 and 9.

When the trailer 1 is in condition for transporting, with the side walls 17 and 18 disposed in upright position, and the top wall panels 19 and 20 disposed in horizontally extending position, as shown in FIG. 3, the side walls 17 and 18 and the top walls 19 and 20 are disposed between the end walls 16 and 16a with the outer faces of the side walls 17 and 18 disposed in uniplanar relation to the end walls 32 and 33, respectively, and the upper face of the top wall panel 20 disposed in substantially uniplanar relation to the top walls 30 of the end walls 16 and 17. Two bumper members 17a and 18a, FIGS. 9–11, made of suitable material such as, for example, blocks of wood, are secured to the outer face of the side wall 34 of each of the end walls 16 and 16a in such position as to abuttingly engage the inner faces of the side walls 17 and 18, respectively, when the latter are disposed in closed position, as shown in FIG. 3. The bumper members 17a and 18a afford abutments for limiting the inward movement of the side walls 17 and 18 during closing movement thereof, and afford supports for the latter when the side walls 17 and 18 are in closed position. A top cover such as, for example, a tarpaulin 43, FIG. 1, may be spread across the top of the trailer body 6 in covering relation thereto, when the trailer body 6 is in closed condition, and may be releasably secured on the trailer body 6 by suitable means such as, for example, snap fasteners 44.

The tent portion 7 of the trailer 1 includes a top wall portion 45, two oppositely disposed side wall portions 46 and 47 are disposed in overlying juxtaposition to the outer faces of the top wall panels 19 and 20 of the body portion 6, respectively, and are nailed or otherwise suitably secured at their lower edges to the top wall panels 19 and 20 adjacent to the junction of the top wall panels 19 and 20 with the side walls 17 and 18, respectively. The lower edge portions of the end walls 48 and 49 are similarly nailed or otherwise suitably secured to the ends of the floor 15 which are adjacent to the end walls 16 and 16a, respectively, of the body portion 6, FIG. 9. Thus, it will be seen that, at all times, the side walls 46 and 47 of the tent 7 are secured to the top wall panels 19 and 20, respectively of the trailer body 6, and the end walls 48 and 49 of the tent 7 are secured to the floor 15 of the trailer body 6.

The main body portion of the tent portion 7 may be made of any suitable tent material such as, for example, water-repellant canvas duck, or the like, but suitable windows may be afforded therein such as, for example, the windows 50 shown in FIGS. 6 and 9, which are afforded in the upper edge portions of the side walls 46 and 47 immediately adjacent to the top 45. The windows 50 may be formed in any suitable manner, but I prefer to form them by affording openings in the main body portion of the tent portion 7 and securing suitable flexible screening material 51, such as, for example, fabric mosquito netting, or the like, to the canvas body portion of the tent in covering relation to the openings. Flaps 52, which are of such size as to completely cover the adjacent windows 50, and which may be made of the aforementioned canvas duck, or the like, may be secured to the main body portion of the tent portion 7 adjacent to the upper edge of the windows 50, in such position on the tent 7 that they may be disposed in completely overlying relation to the windows 50 on the outside thereof, as shown at the right side of FIG. 6, to thereby close the windows 50, or they may be disposed in raised position wherein they rest on the top 45 of the tent 7, as shown at the left side of FIG. 6, to thereby open the windows 50. Suitable fastening means such as snap fasteners 53 may be mounted on the flaps 52 and the side walls 46 and 47 of the tent portion 7 for securing the flaps 52 in closed position relative to the windows 50.

The side wall 47 of the tent portion 7 extends the full length of the top wall panel 20 of the trailer body 2, and the side wall 46 of the tent portion 7 extends from the doorway 28 to the rear end of the top wall panel 19 of the body portion 2. The end edges of the side walls 46 and 47 of the tent 7 are secured throughout their lengths to the adjacent side edge portions of the end walls 48 and 49. The upper edges of the side walls 46 and 47 and of the end walls 48 and 49 are secured throughout their lengths to the respective adjacent edge portions of the top wall 45 of the tent 7.

The ends of the floor 15 and of the top panels 19 and 20 of the body portion 2, and, therefore, the ends of the tent portion 7, are spaced inwardly from the end walls 16 and 16a of the body portion 6 a short distance such as, for example, three inches, FIG. 9. When the tent portion 7 is disposed in collapsed position, and the body portion 6 of the trailer 1 is in closed, or transporting condition the top wall 45 of the tent portion 7 is disposed within the body portion 6 between the floor 15 and the top wall panels 19 and 20, FIG. 3, with the end walls 48 and 49 disposed between the end walls 16 and 16a of the body portion 6 below the level of the top wall panels 19 and 20.

An actuating mechanism 54 is embodied in the trailer 1 for automatically erecting and collapsing the tent portion 7 upon movement of the walls 17–20 of the body portion 6 from the closed position shown in FIG. 3 to the open position shown in FIG. 6, and from the open position shown in FIG. 6 to the closed position shown in FIG. 3, respectively. The actuating mechanism 54 includes two telescoping posts 55 and 56 mounted in upright position on respective end portions of the floor 15, inside the tent portion 7, FIG. 9. The posts 55 and 56 are disposed on the longitudinal center line of the trailer 1, and a substantially straight elongated supporting rod or ridge pole 57 extends between and is secured to the upper ends of the posts 55 and 56. The posts 55 and 56 are disposed inwardly of, but in relatively closely adjacent relation to the end walls 48 and 49, respectively, of the tent portion 7, and are so constituted and arranged that when they are disposed in fully extended position, as shown in FIG. 6, they are of sufficient length that the ridge pole 57 is disposed above the floor 15 a sufficient distance to support the longitudinal center of the tent portion 7 at the height desired therefor when the tent portion 7 is in fully erected position.

Each of the posts 55 and 56 includes an outer housing 58, an inner housing 59, and a center post or core 60 telescopingly arranged relative to each other, FIGS. 6–9. The core 60 is disposed in the inner housing 59 with a freely slidable fit, and the inner housing 59 is disposed in the outer housing 58 with a freely slidable fit. The housings 58 and 59 are open at their tops, and pulleys 61 and 62 are rotatably mounted on the side walls of the housings 58 and 59, respectively, adjacent to the upper parts thereof, FIGS. 6 and 8. In each of the posts 55 and 56, an elongated flexible cable 63 has one end thereof secured to the outer face of the lower end portion of the inner housing 59 by suitable means such as a screw or bolt 64, FIG. 8, in radial alignment with the pulley 61 on the respective posts 55 and 56. The cables 63 are trained over the respective pulleys 61 and the other end portions thereof are secured to the inner face of the side wall 17 of the body portion 6 by suitable means such as screws or bolts 65, FIG. 6. The posts 55 and 56 are so disposed relative to the side wall 17, and the cables 63 are of such length, that when the side wall 17 is disposed in closed position, as shown in FIG. 3, the inner housings 59 rest on the floor 15 of the trailer body 2, and when the side wall 17 is in fully opened position, as shown in FIG. 6, the inner housings 59 of the posts 55 and 56 are supported by the respective cables 63 in fully extended position as shown in FIGS. 6 and 9.

Each of the posts 55 and 56 also includes another elongated flexible cable 66, which has one end attached to the lower end portion of the respective core 60 by suitable means such as a screw or bolt 67, FIG. 8. The cable 66 in each of the posts 55 and 56 is trained over the respective pulley 62 thereon, and the other end portion of the respective cable 66 is secured to the outer face of the outer housing 58 of the respective post 55 or 56 by suitable means such as a screw or bolt 68, FIG. 8. The cables 66 in the posts 55 and 56 are of such length, and are so disposed therein, that when the side wall 17 is disposed in fully closed position, as shown in FIG. 3, the core 60 of each of the posts 55 and 56 rests on the floor 15 of the trailer body 6, and when the side wall 17 is disposed in fully opened position, as shown in FIG. 6, so that the inner housings 59 have been raised to fully extended position, the cores 60 are raised to fully extended position, as shown in FIGS. 6 and 9.

The housings 58 and 59 and the core 60 of each of the posts 55 and 56 are of such length that when the body portion 6 of the trailer 1 is disposed in closed position, as shown in FIG. 3, the ridge pole 57 of the actuating mechanism is disposed in closely underlying relation to the inner face of the top wall panel 19 to thereby afford a support for the inner edge portions of the top wall panels 19 and 20. Such construction assists in relieving the strain on the inter-connection of the top wall panels 19 and 20 and the side walls 17 and 18, respectively, when the trailer 1 is being transported from one location to another in closed position.

In the trailer 1 shown in the drawings, suitable cabinets or shelving units 69 and 70 are mounted in the trailer body 6 and secured to the floor 15 immediately adjacent to the posts 55 and 56, which may be secured to the cabinets or shelf units 69 and 70 by suitable means such as bolts or screws 71, FIG. 9, and the cabinet or shelf units 69 and 70 are preferably of such height that the tops thereof are disposed immediately below the planes of the tops of the posts 55 and 56, when the latter are in fully collapsed position. A stove unit 72 may also be mounted in the trailer body 6 and secured to the floor 15 thereof immediately adjacent to the cabinet or shelf unit 70, FIGS. 10 and 11.

The shelf units or cabinet units 69 and 70 and the stove 72 are of such size, and are so disposed on the floor 15 of the trailer body 6 that they are disposed in inwardly spaced relation to the lateral edges of the floor 15. As may be seen in FIGS. 10 and 11, with the cabinets or shelf units 69 and 70 and the stove 72 disposed in the aforementioned manner in the trailer body 6, substantial storage space is afforded on the floor 15, even when the trailer body is in closed position, as shown in FIG. 3, and substantially greater space is afforded in the trailer 1 when the trailer 1 is in open or erected position as shown in FIGS. 10 and 11.

It has been found that by constructing the trailer 1 in the manner disclosed herein, a trailer may be afforded which, although it is only seven feet and eleven inches wide; eight feet long, between the end walls 16 and 17 thereof; and twenty-nine inches high from the top of the frame 2 to the top of the trailer body 6, when the trailer is in closed position as shown in FIGS. 1, 2, and 3, a living and sleeping area is afforded in the tent portion 7 of such a trailer, when the trailer is in erected condition as shown in FIGS. 4 and 5, which is seven feet and four inches wide, twelve feet long, four and one-half feet high at the sides 46 and 47 of the tent, and eight feet high at the center of the tent. With the trailer body 6 having the aforementioned dimensions, and with the top walls 30 of the end walls 16 and 16a being seventeen inches in width, and with the end walls 16 and 16a being spaced three inches from the adjacent ends of the floor 15, a trailer is afforded wherein the body portion 6 thereof is only ten feet and ten inches in over-all length. This it will be seen affords a trailer which is relatively small in size when in closed position, but which affords relatively spacious living and sleeping quarters when in open position.

With this construction, a living space is afforded within the erected tent 7 of the trailer 1 which affords ample sleeping space for the arrangement of two folding, double beds 73 and 74 therein, disposed in the position shown in FIG. 11, wherein the bed 73 extends longitudinally of the side wall portion 17 at the corner of the tent defined by the end wall 49 and the side wall 27, and with the bed 74 disposed perpendicularly to the length of the side wall 18 at the corner of the tent defined by the side wall 46 and the end wall 18. As may be seen in FIG. 11, this arrangement of the beds 73 and 74 in the erected trailer 1 leaves ample space for moving about in the trailer 1, and even affords space between the bed 73 and the end wall 48 in which may be stored a folding table 75 and folding chairs 76, or the like.

With the trailer 1 constructed in the aforementioned manner, when it is desired to convert the trailer from sleeping accommodations as illustrated in FIG. 11 to living and eating accommodations as shown in FIG. 10, this may be readily accomplished by folding the beds 73 and 74 and moving them into stored position in the corner of the trailer 1 defined by the side wall 46 and the end wall 48 of the tent 7, after which the table 75 and the chairs 76 may be disposed in erected position in the space thus vacated by the bed 73, as shown in FIG. 10. With this arrangement, it will be seen that relatively spacious living quarters are afforded in the trailer 1, with ample room for movement between the cabinet 70 and the stove 72, and also with ample room for movement between the table 75 and the door 29.

Also, it will be seen that with the trailer 1 constructed in the aforementioned manner the closet and storage space afforded by the hollow end walls 16 and 16a is at all times readily accessible whether the trailer is in erected condition, affording living and sleeping quarters or is in closed condition ready for transporting from one location or camp site to another.

In the operation of my novel trailer 1, when it arrives in closed condition at a camp site, or the like, it may be quickly and easily opened into erected condition for affording living and sleeping quarters. This may be accomplished by first removing the cover 43. Thereafter, the top wall panel 20 and the side wall 18 may be swung outwardly and downwardly as a unit from the closed position shown in FIG. 3 to the fully opened position shown in FIG. 6. Supporting rods 77 may be mounted in the brackets 78 projecting outwardly from the top wall panel 20, FIG. 6, and pins or bolts 79 may be inserted through the rods 77 and the brackets 78 to hold the rods 77 in position to support the outer lateral edge of the side wall 18 from the ground or other supporting surface on which the trailer 1 is disposed.

Thereafter, the side wall 17 and the top wall panel 19 may be swung outwardly from the closed position shown in FIG. 3 to the fully opened position shown in FIG. 6. This movement of the side wall 17 and the top wall panel 19 is effective to pull the posts 55 and 56 from the fully collapsed position shown in FIG. 3 to the fully extended position shown in FIGS. 6 and 9. This is effective to automatically fully erect the tent portion 7 of the trailer 1 during the movement of the side wall 17 and the top wall panel 19 to the fully opened position. Thereafter, other supporting rods 77 may be mounted in brackets 78 extending outwardly from the side wall 17 and secured thereto by a pin or bolt 79 in position to support the side wall 17 in horizontally extending position, as previously described with respect to the rods 77 used to similarly support the side wall 18. Thereafter, the operator may enter the thus erected trailer 1 through the doorway 28 and arrange the furniture therein either in position to afford sleeping quarters or living and eating quarters in the trailer 1.

When it is desired to "break camp," this may be readily accomplished by disposing the beds 73 and 74 in folded position, and likewise disposing the table 75 and the chairs 76 in folded position. It is obvious that more than ample space is afforded within the confines of the outlines of the floor 15 of the trailer for storing these units 73–76. The operator may move these units 73–76 into position on the floor 15, and the rods 77 may be removed from the brackets 79 on the side wall 17. The side wall 17 and the top wall panel 19 may then be swung upwardly as a unit from the fully opened position shown in FIG. 6 to the fully closed position shown in FIG. 3. This movement of side wall 17 permits the weight of the tent 7 to fully collapse the posts 55 and 56 into the fully collapsed position shown in FIG. 3, the top 45 of the tent 7 during this movement of the posts 55 and 56 moving downwardly into the body portion 2 of the trailer 1, and the end walls 48 and 49 of the tent 7 moving downwardly into the space between the posts 55 and 56 and the end walls 16 and 16a of the body portion 6 of the trailer 1. Thereafter, the rods 77 may be removed from the brackets 78 on the side wall 18, and the side wall 18 and the top wall panel 20 may be swung upwardly as a unit from the fully open position shown in FIG. 6 to the fully closed position shown in FIG. 3 to thereby complete closing of the trailer 1. Thereafter, the cover 43 may be attached to the top of the body portion 6 of the trailer 1, and the trailer 1 is in normal condition for transporting to another location or camp site.

From the foregoing it will be seen that I have afforded a novel camping trailer 1 which may be quickly and easily erected from closed or collapsed position, and may also be quickly and easily collapsed from erected position into closed position.

In addition, it will be seen that I have afforded a novel camping trailer wherein the tent portion thereof is automatically fully erected when the walls of the trailer body are moved from closed position to fully open position.

Also, it will be seen that I have afforded a novel camping trailer wherein the tent portion thereof is automatically collapsed when the walls of the body portion of the trailer are moved from the fully open position to fully closed position.

Also, it will be seen that I have afforded a novel camping trailer which is relatively small and compact in size, but which affords relatively spacious living and sleeping quarters.

In addition, it will be seen that I have afforded a novel camping trailer wherein the parts thereof are so constituted and arranged as to afford relatively spacious storage space therein when the trailer is in fully collapsed position as well as when it is disposed in fully erected position.

Also, it will be seen that I have afforded a novel camping trailer wherein the parts are so constituted and arranged that the relatively spacious storage space therein is readily accessible at all times.

In addition, it will be seen that I have afforded a novel camping trailer which is practical and efficient in construction and operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A camping trailer comprising supporting means; a body portion mounted on said supporting means and supported thereby; a tent portion mounted on said body portion; said body portion including a substantially horizontally extending floor panel having two end portions, and two oppositely disposed side edge portions extending between said end portions, and two other panels hingedly mounted on respective ones of said side edge portions; said other panels being pivotable between a closed position wherein they project upwardly away from said respective side edge portions, and an open position wherein they project horizontally outwardly beyond said floor panel; the bottom portion of said tent being operatively connected to said end portions and to said other panels; said tent portion including a top, and having an erected position wherein said top projects above said body portion, and a collapsed position wherein said top is disposed within said body portion; and elongated, telescoping means connected to said top of said tent portion and mounted on said body portion in substantially vertically extending position above each of said end portions between said side edge portions; said telescoping means having an extended raised position and a collapsed lowered position; and at least one of said other panels being operatively connected to said telescoping means by means effective to automatically move said telescoping means to said raised and lowered positions and thereby move said tent portion to said erected and collapsed positions upon movement of said other panels to said open and closed positions, respectively.

2. A camping trailer as defined in claim 1, and in which said body portion includes two additional panels mounted on and supported by respective ones of said other panels and movable therewith; and in which said additional panels have a closed position wherein they project from said respective ones of said other panels toward the other one of said other panels, and an open position in which they project upwardly from respective ones of said other panels.

3. A camping trailer as defined in claim 1, and in which said other panels are disposed in substantially uniplanar relation to said floor panel when said other panels are disposed in said open position.

4. A camping trailer as defined in claim 1, and in which said body portion includes two additional panels mounted on and supported by respective ones of said other panels; and in which said additional panels have a closed position wherein they are disposed substantially parallel to said floor panel, and an open position wherein they project upwardly from respective ones of said other panels; and in which said tent portion includes end walls; and in which said end walls project above said body portion when said tent is disposed in said erected position, and said top and end walls are disposed in said body portion between said floor panel and said additional panels when said tent is disposed in said collapsed position.

5. A trailer comprising wheels; a supporting frame mounted on and supported by said wheels; a body portion mounted on and supported by said frame and having an open position and a closed position; said body portion, when disposed in closed position, including one panel disposed in substantially horizontally extending position and affording a floor therefor, two other panels disposed in substantially upright position and affording side walls therefor, two additional panels disposed in substantially parallel relation to said one panel and in overlapping relation to each other to afford a top wall for said body portion, and upright substantially hollow means mounted at respective opposite ends of said one panel and affording end walls for said body portion; said other panels and additional panels being movable from said positions therefor into other positions wherein said other panels are disposed in substantially horizontally extending uniplanar relation to said one panel, and said additional panels are disposed in substantially upright position on respective opposite sides of said one panel and said other panels to thereby open said body portion; a tent portion mounted on and supported by said body portion; said tent portion having a top, end walls, and side walls; said side walls of said tent portion being attached to said additional panels in juxtaposition thereto in all positions of said additional panels; said tent portion having an erected position wherein said top, said side walls and said end walls thereof project above said body portion, and a collapsed position wherein said top and said side walls are disposed in said body portion below said additional panels and between said hollow means; and means connected to said tent portion, including said additional panels, for automatically fully erecting and fully collapsing said tent portion upon movement of said other panels and said additional panels to said other positions and said first-mentioned positions therefor, respectively, said means for erecting and collapsing said tent portion including two elongated posts mounted in said body portion in upright position in inwardly spaced adjacent relation to respective ones of said hollow means and in underlying supporting relation to said top of said tent, each of said posts including an outer housing, an inner housing, and a core, said core being telescopingly mounted in said inner housing, and said inner housing being telescopingly mounted in said outer housing, and means for extending said cores and said inner housings outwardly relative to each other and relative to said outer housings, said last-mentioned means including cable means operatively connected between said cores and said outer housings and cable means operatively connected between said inner housings and one of said other panels.

6. A trailer as defined in claim 5, and which includes storage means secured to and supported by said one panel, said storage means being secured to said posts for holding said post in said upright position.

References Cited in the file of this patent

UNITED STATES PATENTS

| 1,241,342 | Chapman | Sept. 25, 1917 |
| 1,826,426 | Ledwinka | Oct. 6, 1931 |
| 1,826,480 | Rappich | Oct. 6, 1931 |
| 1,864,047 | Lawhorne | June 21, 1932 |
| 2,719,054 | Jennings | Sept. 27, 1955 |